INVENTOR
GERT K. A. SIGGELIN

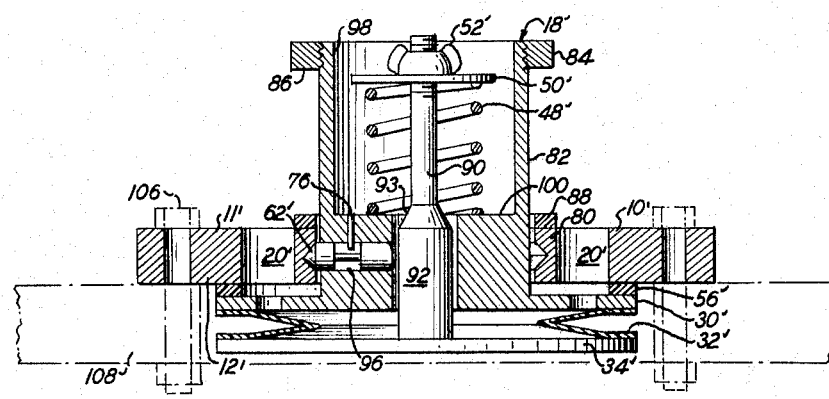
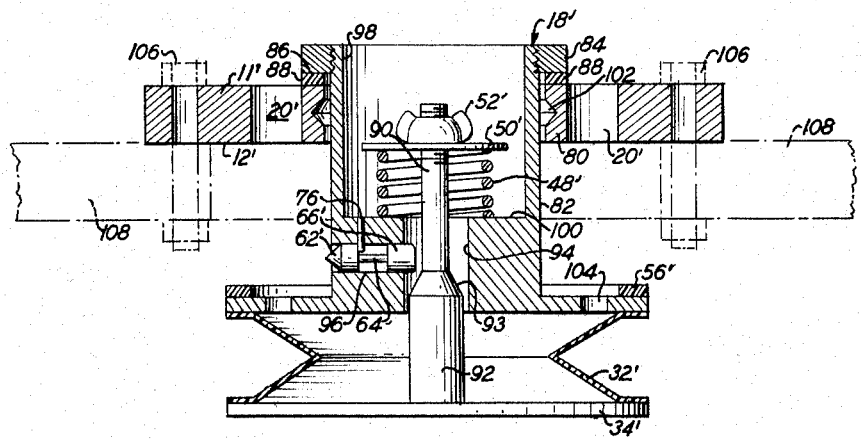

3,263,698
PRESSURE RELIEF VALVE
Gert K. A. Siggelin, 600 River Tower Drive, Alexandria, Va.
Filed Apr. 16, 1963, Ser. No. 273,325
7 Claims. (Cl. 137—467)

This invention relates to a pressure relief valve of substantially improved construction over my prior Patent 2,884,949, issued May 5, 1959.

As described in my prior patent, the present valves also may be set to open whereby instantaneous relief becomes available at some selected but adjustable differential pressure such as usually from 10 to 25 inches of water under negative pressure, but the valve may be satisfactorily used at substantially higher or lower pressure differentials if desired. The valves therein disclosed comprise a pressure releasable port closure which may be conventionally mounted on a port for enclosing a casing, or in a gas container, or duct wall across which a pressure differential may exist. The port closure is latched in closed position by a latching mechanism to support a pressure resilient diaphragm which at some preadjusted pressure differential will trip, whereby the valve closure opens widely for quick pressure release, i.e. as a safety valve. The valve closure is reset to closed and latched position manually at will. The valve also carries means for adjusting the relationship between the diaphragm movement and latch whereby the latching mechanism will be released and the valve port opened at any desired pre-set pressure differential.

Particularly my prior patent included a latching mechanism which, while being comparatively expensive compared to the simplified structure thereof, was not nearly as rugged and reliable as desired. Moreover, upon release of the latching mechanism of the prior structure the closure hinged to one side swung open with such momentum as to be self-damaging. The present valve construction is an improvement on the prior valve in these several respects.

Particularly, the present construction has simple reciprocating movement between open and closed position while latched by a simple pin release. The operation will be further explained by referring to the drawings illustrating the same together with a modification in which:

FIG. 3 illustrates a modification in which the valve port closure is latched near the level of the port; and FIG. 4 shows the same valve as in FIG. 3 in open port position.

Figure 1:
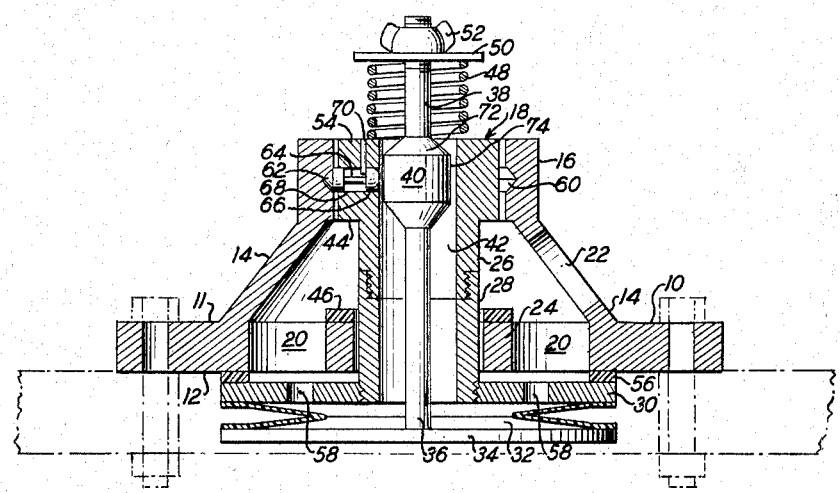
FIG. 1 shows the valve body with the latching means supported above the port in closed position.
Figure 2:
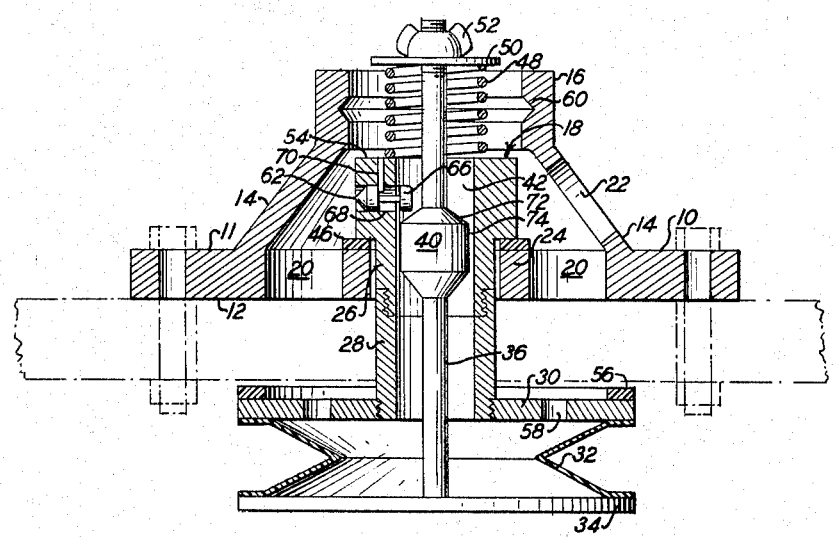
FIG. 2 shows the same valve of FIG. 1 in open port position.

As shown in FIGS. 1 and 2, the valve comprises a wall 10 which may be part of a duct, tank or the like having opposite sides 11 and 12 of which a predetermined pressure of vacuum differential is quickly relieved by operation of the valve. The wall 10 supports through several cage arms 14 an annular ring 16 in which the valve release locking mechanism 18 is supported. The valve release locking mechanism is enlarged to fit slidingly within the ring 16. The valve body supported above wall 10 includes several portholes 20 disposed in annular arrangement, each communicating with the upper side 11 of the valve body through several relief openings 22 disposed between cage arms 14. A central ring 24 of the valve is radially supported by horizontal radial arms between portholes 20.

The valve release locking mechanism 18 comprises a cylindrical upper center tube 26 matingly threaded to lower center tube 28 and both tubes fitted to reciprocate vertically within the annular ring 16 and central ring 24 of the valve body. A valve closure plate 30 is mounted at the lower end of tube 28. The valve closure 30 is connected by flexible bellows 32 to a lower rigid disc. The rigid disc 34 is supported by central control shaft 36 at the lower end and shaft 38 at the upper end co-axial therewith; both shafts 36 and 38 being joined by a piston 40 fitted to slide vertically within central bore 42 of the cylindrical center tube 26. Shoulder 44 which is of larger diameter than cylindrical center tube 26 is intercepted by central ring 24 of the portholes 20. Since the valve opens for quick interchange of pressure across the opposite sides 11 and 12 of wall 10, a resilient ring 46, which may be of rubber or the like is provided to cushion the rapid opening impact of the shoulder 44 against central ring 24.

The upper end of the valve stem 38 has mounted thereabout a compression spring 48 which is confined by seating washer 50 and wing nut 52 at the upper end, and the upper surface 54 of valve release locking mechanism 18 at the lower end. The spring 48 biases rigid port closure plate 34 by stems 36 and 38 vertically upward in closed position with a variable tension, adjustable by wing nut 52, and thereby the opening pressure differential at which the valve becomes operative as will appear.

Bellows 32 and rigid plate 30 are mounted in the closed position as shown in FIG. 1, against the lower surface 12 of the wall 10, thereby closing the portholes 20 through a sealing ring 56 biased to closed position with a force provided by preset spring 48 and held by the latching pin 62. In this closed position the inside of bellows 32 communicates with the portholes 20 through several small openings 58 in closure plate 30. Consequently, the inside of the bellows 32 communicates with the upper side 11 of the portholes through the openings 58.

A triangular-shaped groove 60 is provided around the inner surface of annular ring 16 to receive a tapered locking pin 62 which is connected by a narrow diameter neck or grooved shank 64 to a sliding knob 66 at the inner opposite horizontal end. The horizontal sliding locking pin is thus mounted for radial latching movement within a radial bore 68 of cylindrical center tube 26 at a height to correspond with groove 60 for latching the valve release locking mechanism 18 with valve closure 30, in port closed position against the underside 12 of valve wall 10. A pin 70 is press fitted in a small hole bored vertically in the upper surface 54 of the center tube 26 and extends into the narrow neck or grooved portion above the shank 64 and into latch sliding bore 68 to retain the sliding locking pin therein while allowing radial movement of the latch into and out of latching position. The triangular-shaped groove 60 forms an angle at the apex of about 90° allowing ready release of locking pin 62 thereby permitting mechanism 18 to be released and move downward quickly as biased by spring 48. The piston 40 has a tapered upper surface 72 at an angle of about 45° which bears against the sliding knob 66. This construction permits the valve mechanism to be returned vertically to its upper closure position as the surface 72 bears against knob 66 and forces the latch to move radially outward and latch with pin 62 seated in groove 60. The latching pin 62 is retained in closed position by the cylindrical wall 74 of the piston 40 bearing against the knob 66.

In the closed position of FIG. 1, the wing nut 52 is fastened to compress spring 48 to provide the desired upward seating pressure to rigid disc 34. As the pressure differential between opposite sides 11 and 12 of wall 10 increases, the pressure differential is transferred through the openings 58 in closure 30 to expand bellows 32 against the compression of spring 48. As the pressure differential increases sufficiently beyond the seating of the spring, the expansion of the bellows draws piston 40 downward by stems 36 and 38 against the compression of spring 48 a sufficient distance to allow locking pin 62 to be released from its bearing position in groove 60.

Upon such release the stored resiliency within the bellows expanding against the compression of spring 48 causes the entire valve release locking mechanism 18 to drop vertically downward. The entire mechanism 18 moving downward with both closure 30 and disc 34 uncovers portholes 20 for instant release of the pressure differential therebetween. The rapid downward descent of mechanism 18 is stopped by shoulder 44 impacting against the resilient ring 46 as shown in FIG. 2. Consequently, the valve acts as a quick overload release for equalizing the fluid pressure differential on opposite sides 11 and 12 of the wall 10.

In a modification shown in FIGS. 3 and 4, the annular ring 16 and cage arms 14 of FIGS. 1 and 2 are removed. The valve release locking mechanism 18' is slidably fitted within central port ring 80 and supported by radial arms interposed between the portholes 20' and in a valve wall 10'. The mechanism 18', as in FIG. 1, comprises cylindrical tube 82 threaded on the upper end to receive supporting flange 84 which forms a shoulder at the lower end 86 and rests in the downward position from a flexible cushioning ring 88, preferably formed of rubber. The lower end of the locking mechanism 18' is bored 94 to slidingly receive narrow stem 90 and widened stem 92. About narrow stem 90 is fitted a compression spring 48' with annular plate 50' secured thereto by wing nut 52' on the upper end and by surface 100 on the lower end. A radial slot 96 is bored in cylindrical tube 82 to receive the locking pin 62' having the construction described for FIG. 1.

In this instance securing pin 76 is forced into radial slot 96 to secure the sliding locking pin about the narrow portion 64'. The central port ring 80 has groove 102 for receiving locking pin 62'. The outer cap portion 66' bears against taper 93 between narrow stem 90 and widened stem 92. The valve, as it appears in this modification, operates similar to that described in FIG. 1 and 2, but is modified to eliminate the superstructure comprising the annular ring 16 and cage arms 14. Consequently, the valve is designed to fit with a flat wall 10' comprising a central ring 80 supported within the valve port holes 20'. The spring and wing bolt assembly is adjusted to be substantially hidden within the cylindrical tube 82.

In operation, as before for FIGS. 1 and 2, FIG. 3 shows the valve in closed position with openings 104 communicating with the valve portholes 20' for allowing air passage into the bellows 32'. As the pressure through the portholes increases, expanding the bellows and rigid disc 34' depressing valve stem 90 against the compression of spring 48', the widened stem portion 92 is lowered sufficient to release locking pin 62' from securement within the groove 102. The pressure on spring 48' then causes the entire valve mechanism 18' to be snapped to the open position of FIG. 4, opening valve ports 20' and allowing interchange of gases from the upper side 11' and the lower side 12' of the valve body 10', thus equalizing the pressure on both sides. For resetting the valve rigid disc 34' is merely pressed vertically upward to fit plate 20' against the seal 56' surrounding the valve ports 20'. As before, the pressure upon the valve is adjusted by regulating the compression upon spring 48' by positioning wing nut 52' on the outer end of stem 90. As described, the valve plate 10' may be part of a duct which may consist merely of an annular flange which can be secured by bolts 106 through provided holes to a larger opening in the wall such as a duct 108 shown in the dotted line position of FIGS. 3 and 4.

Various modifications will occur to those skilled in the art. For example, several latching pins can be used. Other types of flexible diaphragms can be substituted for the bellows. Accordingly, it is intended that the description given herein be regarded as illustrative and not limiting except as defined in the appended claims.

I claim:
1. A pressure relief valve for limiting the pressure differential across the wall of an enclosure comprising a valve body, a valve port in said body, a bellows expandable port closure disc upon said port and a valve stem fastened to said bellows and supporting said disc for reciprocation between open and port closure positions, a groove in said valve body, a horizontal latching pin mounted to reciprocate radially of said port with an outer latching fitting within said groove for latching said disc and stem in port closure position of said disc, a shoulder upon said valve stem bearing against an opposite inner end of said latching pin retaining said pin in latched position in said groove, and adjustable resilient means biasing said stem and disc into port closure position with said valve stem shoulder securing said latching pin in latched position, said resilient means being expandable by differential pressure on said disc and bellows across said port to resiliently lower said stem and shoulder, to release said latching pin for radial reciprocation from latched position to release and lower said disc from its port closure position.

2. A valve body as defined in claim 1 wherein the disc and bellows are supported for vertical reciprocation into and out of port closure position by valve stem reciprocating resiliently within a tube, said radial sliding latching pin being mounted radially through the wall of said tube for horizontal movement into and out of latching engagement with said groove with its inner end bearing against the valve stem shoulder, alternately freed and engaged by reciprocal movement of said stem within said tube.

3. A pressure relief valve for limiting the pressure differential across the wall of an enclosure, comprising a valve body to be mounted upon and sealing an opening in said wall, a valve port in said body adapted to communicate with both sides of said wall when said valve is in mounted position thereon, a port closure disc mounted upon said port and sealing the same in closed position against normal passage of fluids through said port, a tubular valve stem having its lower end fastened to and supporting said closure disc upon said port, said tubular stem being mounted in the valve body to reciprocate normal to the port between closed and open port positions, a latch supporting depression cut in the valve body adjacent to the tubular stem, a latching member mounted to slide radially in the wall of said tubular stem at the height of said latch supporting depression in closed port position, the outer end thereof cooperatively secured in said depression latching the said tubular valve stem and closure disc thereon in fixed port closure position, said latching member being biased alternately into horizontal locking engagement with the valve body depression by mechanical pressure on the inner end thereof and out of locking engagement with said depression by means responsive to the pressure differential across said valve port, said pressure differential responsive means comprising a lower bellows disc mounted below said port closure disc and secured thereto by a flexible bellows element forming a bellows chamber between said discs, said bellows being exposed to pressure of fluid on one side of said valve port, said closure disc having small openings in its closure area providing limited fluid communication of the interior of said bellows chamber with the opposite side of said valve port, thereby expanding the vertical positions between discs responsive to the pressure differential across said valve port, a bellows disc stem fastened to and supporting said bellows disc at its lower end, said bellows disc stem being mounted to reciprocate within the said cylindrical valve stem and having a compression spring adjustably mounted about the outer end thereof, biasing both discs together, said bellows disc stem having an enlarged diameter piston surface portion vertically disposed at a height to bear slidingly against the inner end of said latching member holding it engaged with said latch supporting depression in closed port position, the upper piston surface continuing upward into a tapered surface to a bellows disc stem portion of reduced diameter, the said tapered surface, in contact with the inner latching element end, allowing disengagement of said latch element from the latch supporting depression as the bellows stem by expansion of the bellows responsive to the said pressure differential, lowers said bellows stem against the compression of said spring.

4. The valve as defined in claim 3 wherein the valve body comprises a flat plate adapted as a wall closure element covering the opening therein and having a vertically extending boss section, said raised boss section having openings to provide open communication between the port and outer surface of said valve body, the raised body element having an annular opening coaxial with the tubular stem in which the latch supporting depression is cut, said tubular valve stem having at least a portion thereof sized to slidingly fit within said annular opening in reciprocating movement therein.

5. The valve defined in claim 3 wherein the tubular stem has an enlarged diameter collar portion and an annular stop means is mounted in said valve port, cooperating as a stop with the enlarged diameter collar portion of said cylindrical stem, limiting maximum opening movement of said closure disc.

6. The valve as defined in claim 3 wherein the tubular stem body has a reduced diameter portion corresponding approximately to the enlarged diameter piston portion of said bellows stem, the reciprocating latch means being mounted to slide radially of said tubular stem in the said reduced diameter portion into and out of engagement with said bellows stem piston surface.

7. The valve as defined in claim 3 wherein the tubular stem body has a reduced diameter portion corresponding approximately to the enlarged diameter piston portion of said bellows stem, said reduced diameter portion forming a ledge upon which is mounted said compression spring to bear in compression between said ledge and the outer end of said bellows stem, biasing said bellows to collapsed position.

References Cited by the Examiner

UNITED STATES PATENTS

| | | | |
|---|---|---|---|
| 2,525,487 | 10/1950 | Johnson | 137—467 |
| 2,869,579 | 1/1959 | Wilk | 137—467 |
| 3,113,172 | 12/1963 | Barr | 137—467 X |

WILLIAM F. O'DEA, *Primary Examiner.*

ISADOR WEIL, *Examiner.*

H. WEAKLEY, *Assistant Examiner.*